United States Patent [19]

Weber et al.

[11] Patent Number: 5,091,126
[45] Date of Patent: Feb. 25, 1992

[54] PREPARATION OF EXPANDABLE GRANULES, AND THE PRODUCTION OF FOAMS THEREFROM

[75] Inventors: Heinz Weber, Gruenstadt; Gerd Ehrmann, Deidesheim; Franz-Josef Dietzen, Schiffweiler; Eckhard Nintz, Ludwigshafen; Hans D. Zettler, Gruenstadt, all of Fed. Rep. of Germany

[73] Assignee: BASF Aktiengesellschaft, Ludwigshafen, Fed. Rep. of Germany

[21] Appl. No.: 562,659

[22] Filed: Aug. 3, 1990

[30] Foreign Application Priority Data

Aug. 3, 1989 [DE] Fed. Rep. of Germany ....... 3925740

[51] Int. Cl.⁵ .............................................. C08J 9/12
[52] U.S. Cl. ...................................... 264/53; 521/79; 521/81; 521/180; 521/183; 521/189
[58] Field of Search ...................... 264/53; 521/79, 81, 521/180, 183, 189

[56] References Cited

U.S. PATENT DOCUMENTS 4,308,352 12/1981 Knaus ................................. 521/79
4,535,100 8/1985 Krutchen et al. ..................... 521/81

FOREIGN PATENT DOCUMENTS 0186308 7/1986 European Pat. Off. .
0274098 7/1988 European Pat. Off. .
0313171 4/1989 European Pat. Off. .
2437286 4/1975 Fed. Rep. of Germany .
2441539 5/1975 Fed. Rep. of Germany .
1569763 6/1980 United Kingdom .

Primary Examiner—Morton Foelak
Attorney, Agent, or Firm—Oblon, Spivak, McClelland, Maier & Neustadt

[57] ABSTRACT

A process for the preparation of expandable granules based on polyaryl ether sulfones and/or polyether imides, containing from 5 to 20% by weight of a physical blowing agent, the blowing agent and the polymers being mixed in an extruder and subsequently extruded directly into a medium at less than 40° C., and a process for the production of foams from expandable granules based on polyaryl ether sulfones and/or polyether imides, containing from 5 to 20% by weight of a physical blowing agent, the granules being press molded at from 120° to 250° C. and at a pressure of from 5 to 30 bar to form a sheet, and the sheet being subsequently foamed by reducing the pressure, are described.

3 Claims, No Drawings

PREPARATION OF EXPANDABLE GRANULES, AND THE PRODUCTION OF FOAMS THEREFROM

The present invention relates to a process for the preparation of expandable granules and the production of foams therefrom, based on polyaryl ether sulfones or polyether imides or mixtures thereof, containing from 5 to 20% by weight, based on the total weight of the granules, of a physical blowing agent.

Foams based on high temperature resistant polymers are in demand in industry for the production of moldings for a wide variety of applications, for example in automobile and aircraft manufacture and in electronics.

Expandable granules, and foams produced therefrom, based on polyaryl ether sulfones or polyether imides, and processes for their preparation are know per se and described, for example, in GB-A-1,569,763 and EP-A-186,308; however, these processes are not yet entirely satisfactory with regard to reproducibility and economic efficiency.

It is therefore an object of the present invention to provide a process for the preparation of expandable granules based on polyaryl ether sulfones or polyether imides which is reproducible and economic and gives granules which have a long shelf life and can be transported.

It is a further object of the invention to provide a process for the production of foams from the granules obtained by the process according to the invention.

We have found that these objects are achieved by a process for the preparation of expandable granules based on polyaryl ether sulfones or polyether imides or mixtures thereof, containing from 5 to 20 % by weight, based on the total weight of the granules, of a physical blowing agent, where the blowing agent and the polymers are mixed in an extruder and subsequently extruded directly into a medium at less than 40° C.

In addition, we have found that the further object is achieved by a process for the production of foams from expandable granules based on polyaryl ether sulfones or polyether imides or mixtures thereof, containing from 5 to 20% by weight, based on the total weight of the granules, of a physical blowing agent, where a) the granules are press molded at from 120° to 250° C. and at a pressure of from 5 to 30 bar to form a sheet of thickness from 1 to 20 mm, and the sheet is subsequently b$_1$) foamed by reducing the pressure or b$_2$) after cooling under pressure, foamed by reheating to from 150° to 250° C., and, if desired, c) the foam obtained in this way is subjected to thermal treatment in order to substantially remove the blowing agent still present.

The polyaryl ether sulfones or polyether imides used to prepare the expandable granules are known per se; they can be prepared by customary processes, as described in EP-A-274,098 or DE-A-2,437,286 and DE-A-2,441,539.

Examples of suitable polyaryl ether sulfones are those prepared by the process of EP-A-274,098. Preferred polyaryl ether sulfones are those which contain the general structural units

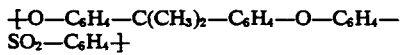

and

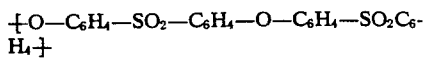

Suitable polyether imides are polymers which contain recurring units of the general formula

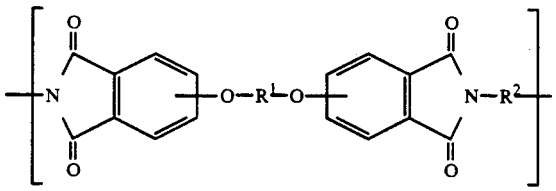

in which
R$^1$ is an aromatic radical having from 6 to 30 carbon atoms,
R$^2$ is a divalent organic radical, selected from the group comprising
   a) aromatic hydrocarbon radicals having from 6 to 20 carbon atoms, and halogenated derivatives thereof,
   b) alkylene radicals, polydiorganosiloxane containing terminal C$_2$— to C$_8$-alkylene groups, or cycloalkylene radicals having from 2 to 20 carbon atoms, and
   c) divalent radicals covered by the formula

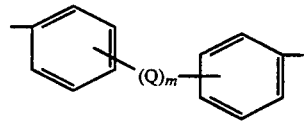

in which
Q is —O—, —CO—, —SO$_2$—, —S— or —C$_x$H$_{2x}$,
x is an integer from 1 to 5 and m has the value 0 or 1.

Of these, the compound in which R$^1$ is —C$_6$H$_4$—C(CH$_3$)$_2$—C$_6$H$_4$, and R$^2$ and —C$_6$H$_4$— is preferred.

Suitable physical blowing agents are halogenated hydrocarbons, such as dichloromethane and chlorobenzene, ketones, ethers and N-methylpyrrolidone, preferably methyl ethyl ketone, acetone, dichloromethane and tetrahydrofuran. Mixtures of physical blowing agents are also advantageous.

In order to produce light, small-celled foams, it is possible to incorporate a chemical blowing agent, such as azodicarboxamide, into the expandable granules in addition to a physical blowing agent, as mentioned, for example, in U.S. Pat. No. 4,308,352.

Furthermore, nucleating agents, such as talc, finely divided silicon dioxide, carbonates or glass fibers, and, if desired, flameproofing agents, such as zinc borate and/or boron trioxide, can be mixed into the granules. The flameproofing agents themselves also affect nucleation.

The expandable granules are preferably prepared in twin-screw extruders, in particular in co-rotating systems, by vigorously mixing the components.

In contrast to the mechanical blowing processes, the polymer in the process described here is not heated to above the glass transition temperature of the blowing agent-free polymer before addition of the blowing agent, since the blowing agent reduces the glass transition temperature of the polyaryl ether sulfone or polyether imide, which makes processing possible at extruder cylinder temperatures of from 50° to 160° C., preferably from 70° to 140° C., with, inter alia, considerable energy advantages.

For trouble-free operation of the plant, it is necessary to separate the injection of blowing agent from the metering of polymer. This and the homogenization effect which is desired can be achieved, for example, by choosing a suitable screw configuration.

Suitable dies are the units known per se, with a nozzle having one or more bores preferably being employed. The shear rates in the nozzle bore are preferably from 100 to 4000 s$^{-1}$, in particular from 200 to 2000 s$^{-1}$, and the mean delivery rates are preferably from 10 to 1500 mm/s, very preferably 100 to 1000 m/s.

In order to prevent the strand emerging from the die immediately foaming, immediate cooling to below the softening point is necessary, advantageously below 40° C., in particular below 25° C. In a preferred embodiment, the material is extruded through a nozzle below the water surface into a waterbath and subsequently granulated. The water may also be replaced by other media of adequate thermal diffusivity which are inert toward the polyaryl ether sulfone or polyether imide used.

If the emerging strand is not cooled during extrusion, it immediately foams up. In this way, it is also possible to produce foam webs, but these cause a high transport volume. The width of the webs required on application necessitate very large and thus expensive extruders.

The expandable granules prepared by the process according to the invention contain from 5 to 20% by weight of blowing agent and have a long shelf life, and advantageously only require a small storage and transport volume.

In the process according to the invention for the production of foams from expandable granules based on polyaryl ether sulfones or polyether imides or mixtures thereof, the granules, which still contain from 5 to 20% by weight of blowing agent and, if used, from 0.5 to 10% by weight, in particular from 1 to 5% by weight, of nucleating agent, are, in a first process step, press molded by increasing the temperature and the pressure to form a sheet. Equipment known per se is used, with a heatable and coolable positive mold integrated in a press being preferred. In this case, the granules are introduced evenly into the lower, trough-shaped part of the mold; preferably, from 0.05 to 0.3 kg, in particular about 0.1 kg, of granules are employed per dm$^2$ of mold base area. After closing the mold by means of the upper part, the granules are heated to from 120° to 250° C., preferably from 150° to 210° C., at a molding pressure of from 5 to 30 bar, preferably from 8 to 20 bar, and kept at this temperature and pressure for from 1 to 10 minutes, preferably from 3 to 8 minutes. The reason for these relatively short times is that compact, foamable granules and the compact sheet produced therefrom have a considerably greater thermal conductivity than, for example, a foam. The granules are thus converted into a compact, blowing agent-containing sheet with a thickness of from 1 to 20 mm, in particular from 8 to 12 mm. This sheet is preferably foamed immediately in a second process step within from 30 to 300 seconds, in particular within from 60 to 180 seconds, by reducing the pressure to from 10 to 1 bar, preferably to from 5 to 1 bar. However, it is also possible to foam this foamable sheet, after cooling under pressure, by reheating to from 150° to 250° C., preferably to from 170° to 220° C. The foamable sheet can also be demolded, stored and foamed later. This process gives a foam block with a height, for example, of from 20 to 30 cm and a base area corresponding to the mold used.

The amount of granules introduced into the mold per unit area, the amount of blowing agent present and the foaming temperature affect the density of the foam obtained.

The positive mold process which is preferably used does not produce the normal, more spherical cells, but instead produces cells which are extended in the foaming direction, ie. the L/D ratio is preferably in the range from 5:1 to 12:1. The consequence of this is that the compressive strength in the direction of orientation is increased for the same density. Accordingly, comparatively high compressive strengths can be achieved even at low densities, as are important, for example, in aircraft manufacture.

According to a preferred embodiment of the process according to the invention for the production of foams, mixtures of chemical and physical blowing agents are used, which causes additional nucleation of the foam, which becomes particularly light and fine celled.

The foam produced in this way initially still contains considerable amounts of blowing agent. If necessary, the blowing agent content can be reduced to less than 0.5% by weight in a third process step by dividing the foam into sheets having a thickness of from 3 to 30 mm, preferably from 8 to 12 mm, and conditioning the latter for from 10 to 120 minutes, preferably from 20 to 60 minutes, at a temperature increasing to 200° C., preferably to 180° C., in drying ovens. The reduction in the softening range due to the blowing agent still present in each case determines the maximum possible drying temperature.

The thermoplastic behavior of these foam sheets makes thermoforming possible in suitable equipment.

The flat or shaped foam sheets obtained in this way can be laminated (as the core material) with resincontaining glass fiber fabrics in a manner known per se, thus improving, in particular, the mechanical properties and the fire behavior. Processes for the production of such laminates are known per se to those skilled in the art and are described, for example, in EP-A-313,171.

The process according to the invention for the preparation of expandable granules or for the production of foams have excellent reproducibility and economic efficiency without the product properties being impaired. It is advantageous that each of the individual process steps can be carried out, if expedient, at different locations.

EXAMPLES 1 TO 5

Preparation of granules and production of foams based on polyaryl ether sulfones

EXAMPLE 1

10 parts by weight of polyether sulfone powder Victrex P 4100 from ICI (BET surface area 19.7 m$^2$/g, mean grain size 450 μm), 0.1 part by weight of talc and 1.2 parts by weight of methyl ethyl ketone were metered per hour into a twin-screw extruder.

The maximum housing temperature was kept at 140° C. and reduced to 110° C. before the discharge nozzles. The melt was introduced directly into a waterbath at 20° C. via round-section dies, and the solidified extrudate was dried and granulated.

The granules had a bulk density of 675 kg/m$^3$ and contained 8.5% by weight of methyl ethyl ketone and 0.7% by weight of water. These blowing agent-containing granules had a shelf life of months in sealed drums.

0.1 kg of granules were introduced per dm$^2$ of base area into a positive mold. At 195° C. and a molding pressure of 20 bar and molding duration of 5 minutes, a blowing agent-containing sheet of thickness 10 mm was produced and was foamed to form a foam block of height 20 cm. After being divided into sheets of thickness 10 mm, the material was conditioned for 20 minutes at temperatures increasing to 190° C. in drying ovens, which reduced the blowing agent content from 3.5% by weight to 0.2% by weight.

The product had a density of 59 kg/m$^3$.

At a foaming temperature of 190° C., a foam having cells elongated in the foaming direction and measuring 0.9×8 mm was obtained. The compressive strength (DIN 53 421) was 0.61 N/mm$^2$ at a density of 47 kg/m$^3$.

The heat distortion resistance was 225° C. (DIN 53 424, pressure experiment).

If blowing agent-containing granules are prepared as in Example 2 and, in addition, 0.4 part by weight of zinc borate is incorporated, the values shown in the table are obtained.

Testing in the OSU chamber in accordance with Federal Aviation Regulation "Airworthiness Requirements for Commercial Aircraft", 25.853 "Fire Protection, Interior Cabin Fittings", Requirement Class (a-1), "Heat Liberation", sample sheets measuring 150×150×10 mm are also shown in the table.

| Density [kg/m$^3$] | Flameproofing agent | [% by wt.] | Blowing agent [% by wt.] | Foaming temperature [°C.] | OSU values HRR [kW/m$^2$] | HR [kW.min/m$^2$] |
| --- | --- | --- | --- | --- | --- | --- |
| 47 | — | — | 9.5 | 190 | 34 | 25 |
| 36 | 3ZnO.2B$_2$O$_3$ | 4.0 | 10.4 | 200 | 11 | 5 |
| 55 | 3ZnO.2B$_2$O$_3$ | 4.0 | 10.4 | 170 | 27 | 23 |

EXAMPLE 2

10 parts by weight of copolymer comprising 95% by weight of
$\{O-C_6H_4-SO_2-C_6H_4\}$ units and 5% by weight of
$\{O-C_6H_4-C(CH_3)_2-C_6H_4-O-C_6H_4-SO_2-C_6H_4\}$ units were metered per hour into a twin-screw extruder. The polymer had a viscosity number of 52 dl/g, measured using 1 g/100 cm$^3$ in N-methylpyrrolidone, and comprised spherical particles of diameter 1 mm, had a BEt surface area of 13.4 m$^2$/g and a bulk density of 190 kg/m$^3$.

In addition, 1.3 parts by weight of methyl ethyl ketone and 0.5 part by weight of short glass fibers of diameter 10 μm and fiber lengths from 0.05 to 5 mm were added per hour.

As described in Example 1, blowing agent-containing granules containing 9.5% by weight of methyl ethyl ketone and having a bulk density of 630 kg/m$^3$ were produced in the twin-screw extruder at a maximum housing temperature of 170° C. These granules were introduced into a rectangular mold and fused together to form a sheet approximately 10 mm thick by pressing down the ram. The temperatures used affect the density of the foams obtained (see Table). After the press is opened at the specified temperatures, the foam expanded upwards and sideways and had a predominantly isotropic cell structure. The cell diameter was 0.3 to 0.8 mm.

|   | Foaming temperature [°C.] | Density [kg/m$^3$] | Compressive strength (DIN 53 421) [N/mm$^2$] |
| --- | --- | --- | --- |
| 1 | 150 | 72 | 0.98 |
| 2 | 180 | 48 | 0.45 |
| 3 | 200 | 38 | 0.20 |

The shear modulus of sample 2 was 10.5 N/mm$^2$ (DIN 53 294).

EXAMPLE 3

The procedure was as in Example 2, but the foam was not allowed to expand on all sides, but instead only upwards by providing a lateral limitation.

EXAMPLE 4

Compared with Example 2, the starting material described was subjected to various types and amounts of blowing agent. At a foaming temperature of 195° C., foams of various densities are obtained (see table). The foaming occurred in a particular direction (see Example 3); the cells were therefore extended in the ratio of from 6:1 to 10:1.

| Blowing agent [Parts by weight metered in per 10 parts by weight of polymer] | Present in the granules [% by wt.] | Density [kg/m$^3$ at a foaming temp. of 195° C.] | Compressive strength in accordance with DIN 53 421 [N/mm$^2$] |
| --- | --- | --- | --- |
| Methyl ethyl ketone | | | |
| 1.5 | 9.2 | 47 | 0.59 |
| 1.4 | 8.0 | 57 | 0.78 |
| 1.3 | 7.4 | 62 | 0.92 |
| Acetone | | | |
| 1.2 | 6.7 | 71 | — |

EXAMPLE 5

The procedure was as in Example 1, but 0.2 part by weight of azodicarboxamide was additionally metered in per 10 parts by weight of polymer. The blowing agent content in the granules was 10.2% by weight. A foam of density 35 kg/m$^3$ and having cell diameters of from 0.2 to 0.4 mm was obtained at a foaming temperature of 190° C.

EXAMPLE 6

Preparation of granules and production of a foam based on polyether imide.

Polyether imide powder having a mean grain size of 380 μm and a viscosity number of 53 dl/g, measured using 1 g/100 cm$^3$ in trichloromethane, was metered into 10 parts by weight in a twin-screw extruder. In addition, 0.2 part by weight of talc and 2.0 parts by weight of a blowing agent mixture comprising 7 parts by volume of dichloromethane and 3 parts by volume of tetrahydrofuran were added per hour.

The maximum housing temperature was kept at 140° C. and reduced to 110° C. before the discharge nozzles. The melt was introduced directly into a waterbath at 25° C. via round-section dies, and the solidified extrudate was dried and granulated.

Granules having a blowing agent content of 15% by weight were obtained. The granules were fused together, as described in Example 1, in a positive mold at 150° C. to form a sheet of thickness about 8 mm. After the mold had been opened at 150° C., a foam cube with the base area of the mold and a thickness of 150 mm was produced. The blowing agent content was reduced from 5% by weight to 0.4% by weight by heating for several hours at 120° C. The density was 55 kg/m$^3$; the heat distortion resistance was 218° C. (DIN 53 424, pressure experiment).

We claim:

1. A process for the preparation of expandable granules based on a polyaryl ether sulfone or a polyether imide or a mixture thereof, containing from 5 to 20% by weight, based on the total weight of the granules, of a physical blowing agent, the blowing agent and the polymers being mixed in an extruder and subsequently extruded directly into a medium at less than 40° C.

2. The process for the production of a foam from expandable granules based on a polyaryl ether sulfone or a polyether imide or a mixture thereof, containing from 5 to 20% by weight, based on the total weight of the granules, of a physical blowing agent, where
   a) the granules are press molded at from 120° to 250° C. and at a pressure of from 5 to 30 bar to form a sheet having a thickness of from 1 to 20 mm, and the sheet is subsequently
   $b_1$) foamed by reducing the pressure or
   $b_2$) after cooling under pressure, foamed by reheating to from 150° to 250° C.

3. A process as claimed in claim 2, where, after step $b_1$) or $b_2$), the foam obtained in this way is subjected to thermal treatment c) in order to substantially remove the blowing agent still present.

* * * * *